United States Patent
Higgs et al.

(10) Patent No.: US 6,742,129 B1
(45) Date of Patent: May 25, 2004

(54) SOFTWARE SECURITY MECHANISM

(75) Inventors: Raymond J. Higgs, Grandby, CT (US); Richard W. Garmon, Harwinton, CT (US)

(73) Assignee: Carrier Corporation, Farmington, CT (US)

(*) Notice: Subject to any disclaimer, the term of this patent is extended or adjusted under 35 U.S.C. 154(b) by 0 days.

(21) Appl. No.: 09/456,354

(22) Filed: Dec. 8, 1999

(51) Int. Cl.[7] .............................. H04L 9/00; H04N 7/167
(52) U.S. Cl. ........................ 713/202; 380/202; 705/57; 705/58; 705/59
(58) Field of Search ................................ 713/202

(56) References Cited

U.S. PATENT DOCUMENTS

| | | | |
|---|---|---|---|
| 4,796,220 A | | 1/1989 | Wolfe |
| 4,908,861 A | * | 3/1990 | Brachtl et al. ............... 713/187 |
| 4,959,861 A | * | 9/1990 | Howlette .................... 713/200 |
| 5,182,770 A | | 1/1993 | Medveczky et al. |
| 5,490,216 A | | 2/1996 | Richardson, III |
| 5,887,131 A | * | 3/1999 | Angelo ....................... 713/202 |
| 5,949,882 A | * | 9/1999 | Angelo ....................... 713/185 |
| 5,953,422 A | * | 9/1999 | Angelo et al. ............... 713/185 |
| 6,003,136 A | * | 12/1999 | Schanze .................... 713/201 |
| 6,018,712 A | * | 1/2000 | Pactong ........................ 705/1 |
| 6,178,511 B1 | * | 1/2001 | Cohen et al. ................ 713/201 |
| 6,226,744 B1 | * | 5/2001 | Murphy et al. ............. 713/200 |
| 6,243,816 B1 | * | 6/2001 | Fang et al. .................. 713/202 |
| 6,275,944 B1 | * | 8/2001 | Kao et al. .................... 713/202 |
| 6,487,662 B1 | * | 11/2002 | Kharon et al. .............. 713/186 |

FOREIGN PATENT DOCUMENTS

WO      WO 99 60458 A      11/1999

* cited by examiner

*Primary Examiner*—Thomas R. Peeso
*Assistant Examiner*—Kambiz Zand

(57) ABSTRACT

A load program causes a user's computer to generate an intermediate code as a function of a read time from the computer's system clock and an operating system ID. The software provider receives the intermediate code from the user and generates a password as a function of the intermediate code and a secret product ID code for the software that the user wishes to install. The load program within the user's computer uses the same mathematical algorithm to compute an internal key upon the next execution of the load program. The internal key is compared with the software supplier's password following a prompt from the load program to enter the supplier's password. The software supplier's password and the internally generated password must both agree before the load program authorizes execution of the software that the user wishes to install.

8 Claims, 3 Drawing Sheets

SOFTWARE SECURITY MECHANISM

BACKGROUND OF THE INVENTION

This invention relates to security mechanisms which prevent unauthorized use of the software, and in particular to mechanisms which prevent the unauthorized use of software on more than one computer.

Various security mechanisms have been heretofore devised for preventing the use of software without authorization of the software supplier. These have included hardware security devices, which must be attached to a computer before the software can run on the computer. Typically, the software that is to run includes an inquiry which looks for an indication that the hardware device has been installed. Such hardware security devices assure that the software will only execute on one computer at any one time. These hardware devices can, however, be relatively expensive and moreover need to be adaptable to various types of computers in which they are to be attached.

Other security mechanisms include software devices that look for an identification of the computer in which the software is to be installed rather than the presence of any hardware device. Such software devices often require complex algorithms to generate a unique association of the program to be run with the identification of the host computer. These software devices may still require that other hardware devices be connected to the host computer in order to establish the unique association of the program to be run with the target computer. Such a system is disclosed in U.S. Pat. No. 4,683,553 which requires that a card reader be used to associate the program to be run with the host computer.

It is an object of the invention to provide a software security mechanism which authorizes run time execution of certain software only after generating an association of the software to be run with a single computer in a manner that does not require. extremely complex algorithms or the attachment of any additional devices to the target computer.

SUMMARY OF THE INVENTION

The above and other objects of the invention are achieved by a load program that must be successfully executed by a targeted computer any time a user wishes to install particular software into the targeted computer. The load program will cause the targeted computer to read the amount of time indicated by an internal system clock within the computer to which the software is to be installed. The computer furthermore reads an internally coded identification of the operating system software installed in the computer. The computer proceeds to generate an intermediate code that is a function of the read amount of time from the system clock and the internally coded identification of the operating system. The thus computed code is preferably displayed to the user.

In a preferred embodiment, the user understands that the displayed code is to be communicated to the software supplier along with a brief description of the software that the user wishes to install in the computer. The software supplier maintains a secret ID code for the described software. The software supplier generates a password which is a function of the code generated by the user's computer and the secret ID code for the described software. The thus generated password is communicated to the user with instructions to again run the load program.

When the load program is run again, the previously stored time indicated by the system clock is read along with the internally coded identification of the operating system. The above two values are again used to compute the intermediate code that was previously displayed to the user. The computer proceeds to calculate an internal key using the same mathematical function used by the supplier to compute the password communicated to the user. This mathematical function is a function of the newly generated intermediate code and the secret ID code for the software to be installed. In this regard, the secret ID code for the software to be installed is preferably imbedded in the software so that it may be read by the load program. The load program next requires the target computer to request that the user enter the password that has been provided by the software supplier. The user entered password provided by the software supplier is then compared with the internally computed key that has been generated using the same mathematical algorithm used by the software provider. The load program authorizes the running of the particular software in the event that the internally computed key matches the entered password.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
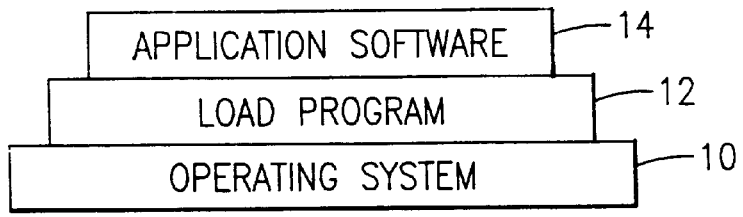
FIG. 1 is an illustration of the relationship between an operating system, a load program, and an application program that is to run on a computer following authorization by the load program.

Referring to FIG. 1, an operating system 10 supports the execution of a load program 12, which in turn authorizes the running of an application software product 14. It is to be appreciated that the operating system 10 resides in a computer system in which the load program and application software product are to be installed. In order to successfully install and run the application software product, it is necessary that the load program 12 authorize the actual running of the application software product 14.

Figure 2A:
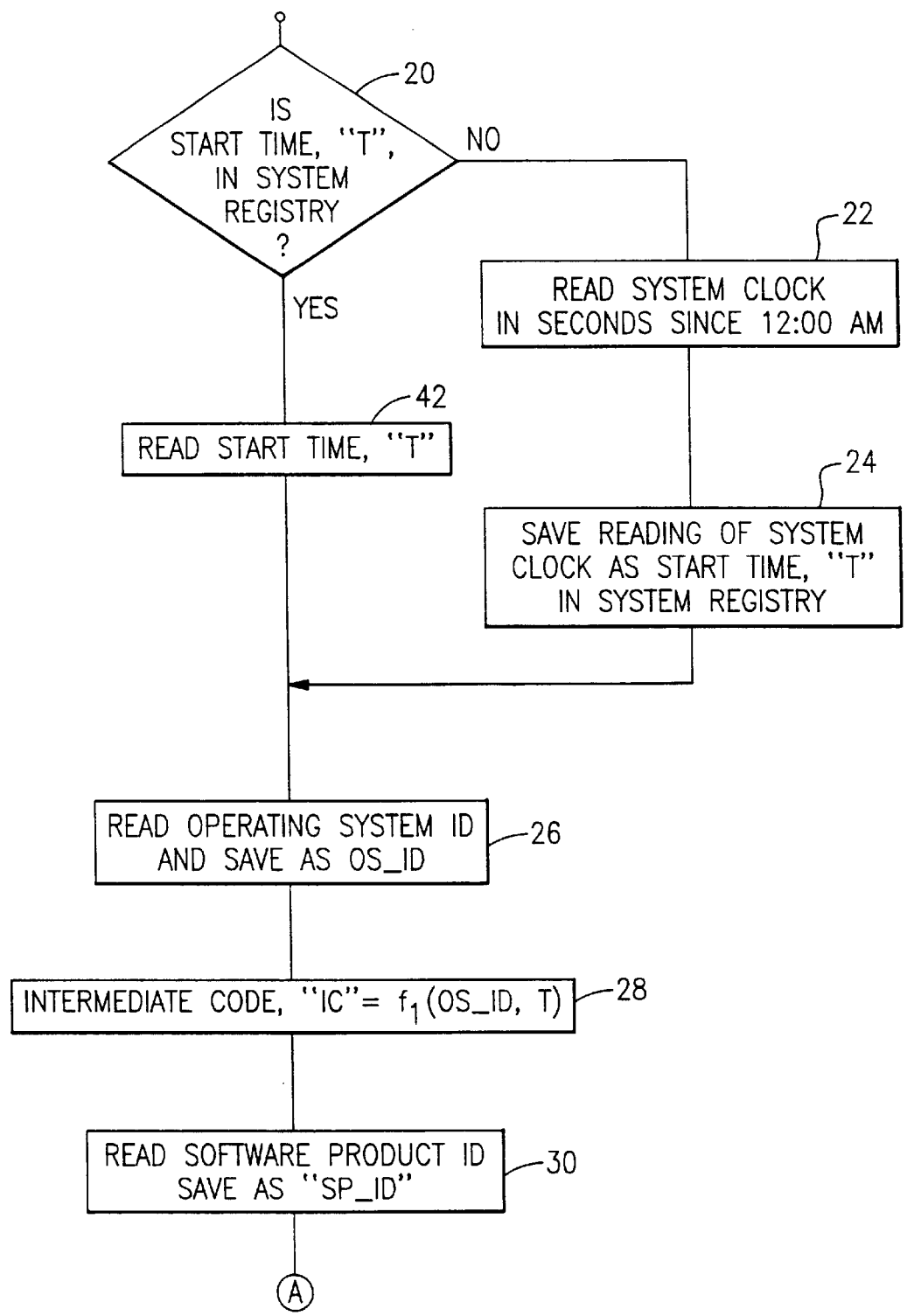
FIG. 2 is a flow chart of the load program which authorizes a computer having the operating system of FIG. 1 to run the application program of FIG. 1.
Figure 2B:
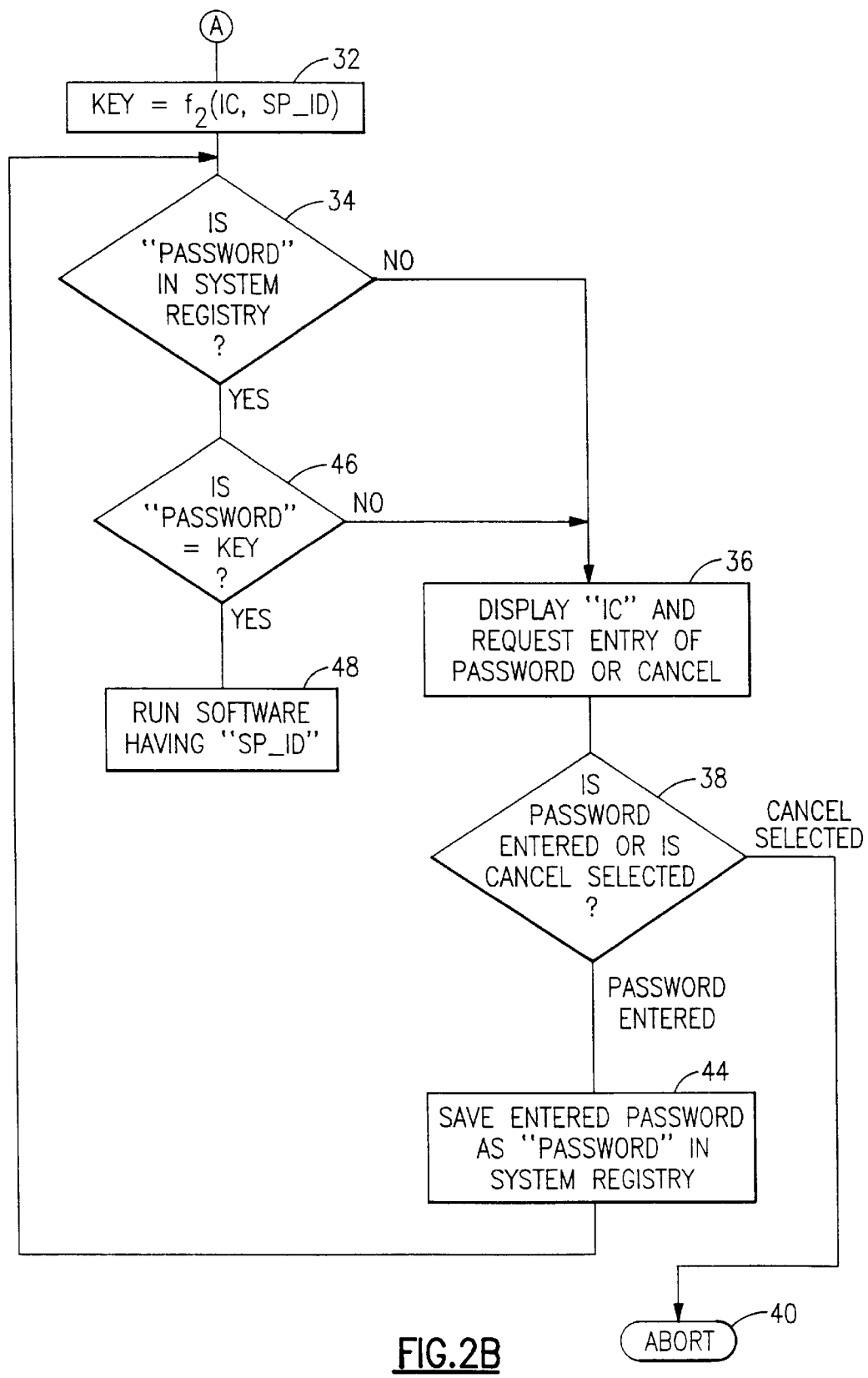

Referring to FIG. 2, a flow chart of the load program 12 is illustrated. The load program begins with a step 20, which inquires as to whether a start time "T" is stored in a system registry. In this regard, the operating system 10 of FIG. 1 preferably includes a system registry wherein values of various parameters previously defined to the operating system may be found. It is to be noted that the Windows operating systems available from Microsoft Corporation contain such a system registry which may be read by the load program.

Assuming that the load program is being run for the first time, there would be no start time "T" present in the system registry of the operating system. This would prompt the processor running the load program to proceed along a no path to a step 22. Referring to step 22, a system clock normally built into the operating system 10 or otherwise present in the computer running the operating system will be preferably read in seconds. The number of seconds will preferably be the amount of time in seconds since midnight or 12:00AM. In the event that the system clock does not directly indicate this time, then a routine will preferably determine the number of seconds since midnight. In any event, there will be a definite number preferably indicating elapsed time from midnight after the computer executed executes step 22 of the load program. This read time in seconds will be stored in the system registry of the operating system 10 as the start time "T" in step 24. The computer executing the load program will next proceed to a step 26 and read the identification number of the operating system 10. In this regard, the operating system 10 will preferably be a Windows operating system having an internally coded unique identification number for the particular copy of the operating system. This operating system ID will be stored in the system registry of the operating system. The thus read operating system ID will be stored as OS_ID in a step 26. The computer executing the load program will next proceed to a step 28 and compute an intermediate code "IC". The computed intermediate code will be a function "$f_1$ (OS_ID, T). It is to be appreciated that the particular mathematical function $f_1$ (OS_ID,T) can be almost any arbitrarily defined mathematical function of the two variables "OS_ID" and "T". The processor executing the load program will next read an imbedded software product ID in the application software product 14. In accordance with the invention, this software product ID will be a unique number assigned to the particular software product provided by the software supplier. This software product ID, is saved as "SP_ID". The processor executing the load program will proceed to a step 32 wherein a value of a variable "KEY" is computed. The KEY variable is seen to be a function $f_2$(IC, SP_ID). It is to be appreciated that $f_2$(IC, SP_ID) can be any arbitrarily defined mathematical algorithm of the intermediate code "IC" and the software product ID, SP_ID. Following execution of step 32, the load program requires the computer to proceed to a step 34 wherein inquiry is made as to whether a "PASSWORD" appears in the system registry of the operating system 10. Assuming no password has yet been entered, the load program will require the computer to proceed to a step 36 and display the intermediate code "IC". The load program will also cause the computer to display a request that the user either respond by entering a password or a cancellation response.

The computer executing the load program will proceed to a step 38 and inquire as to whether a password has been entered or a cancellation has been selected. It is to be appreciated that the user will normally enter a cancellation since no password will have been provided to the user when the load program is first executed. This will prompt the computer executing the load program to proceed to an abort step 40.

An authorized user will preferably have been instructed to forward the intermediate code appearing on the user's computer to the software provider along with a brief description of the particular application software product that is to be installed on the computer. The description of the application software product may for instance be the title of the application software product or any other piece of information that distinguishes the particular application software from other software that may be provided by the software supplier.

Figure 3:
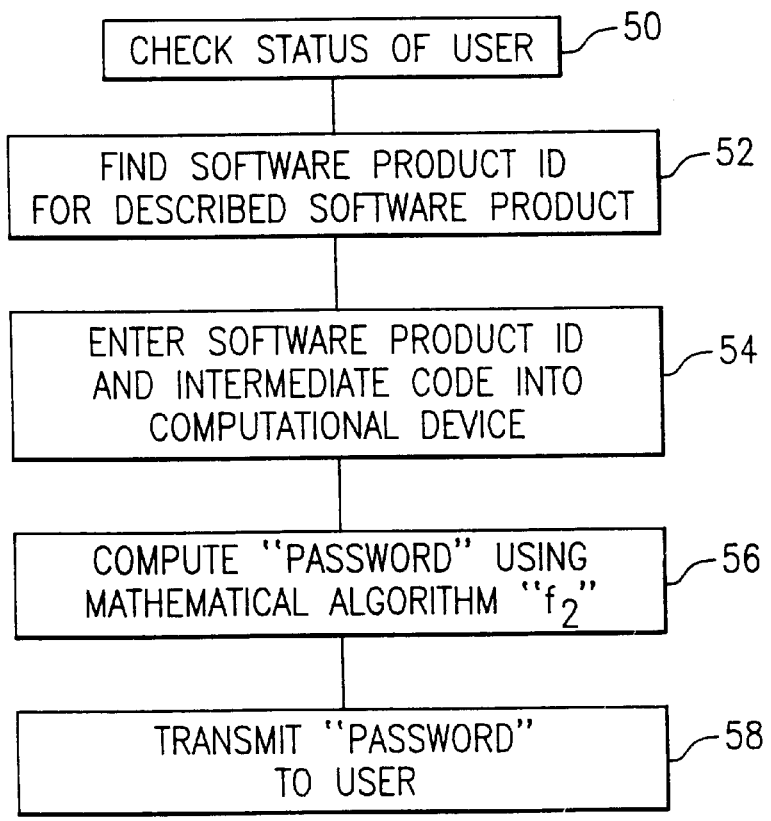
FIG. 3 is a flow chart of a computational process used by a provider of the application software in order to generate a password to be entered into the load program of FIG. 2.

Referring to FIG. 3, a flow chart of a computational process used by the software supplier in response to receipt of the intermediate code and description of the application software from a user is illustrated. It is to be appreciated that the software provider could receive the aforementioned information manually or the same could be received by a computer system having a direct communication link with the user's computer whereby information from the user's computer is directly communicated to the software provider's computer. In any event, the software provider will preferably have a way of certifying that the user communicating the intermediate code is in fact a registered and authorized user of a purchased application software product package in a step 50. In the event that they are, the software provider will proceed in a step 52 to find a corresponding software product ID for the description of the application software product received from the user. It is to be appreciated that this software product ID will be the same as the software product ID embedded in a software product provided to the user. The software supplier will proceed to a step 54 and preferably enter the intermediate code sent by the user into a local computation device, which could be a computer system. The computational system will compute a "PASSWORD" in a step 56. The computed value of the PASSWORD will be in accordance with the function "$f_2$" used to compute the "KEY" variable in the load program of FIG. 2. In this regard, the mathematical algorithm "$f_2$" will be a function of intermediate code IC and the software product ID. In accordance with the invention, the software provider will communicate the thus computed password to the user in a step 58. As has been previously discussed, this could be done through an interactive communication link with the user's computer.

Referring again to FIG. 2, upon receipt of the communicated password from the software supplier, the user will install the load program and application software into the user's computer. This will prompt the load program to again execute step 20 wherein an inquiry is made as whether a start time "T" has been stored in the system registry of the operating system. Since a start time will have been previously entered into the system registry during the first or initial execution of the load program, the user's computer will proceed to a step 42 to read the start time "T". The computer executing the load program will next proceed to step 26 and read the operating system ID, and save as OS_ID. The computer will again compute the intermediate code, "IC" as a function of OS_ID and the read start time "T" from step 42. The load program will next require the computer to read the software product ID and save as SP_ID, before computing the "KEY" in step 32. It is again to be noted that "KEY" is computed as a mathematical function $f_2$ of the intermediate code "IC" and the software product ID, SP_ID, read in step 30. The computer executing the load program will proceed to step 34 and inquire as to whether a password has been entered into the system registry. Since the user will not have yet typed in the password, the computer will proceed to step 36 and display the computed intermediate code and request entry of password. It is to be appreciated that the user will have been instructed to enter the password at this particular prompt when viewed on the screen. This should result in the computer executing the load program to so note the entry of a password in step 38. The entered password is saved as "PASSWORD" in the system registry in step 44. This will prompt the computer to again proceed to step 34 to inquire whether the password is in the system registry. Since the password will now be in the system registry, the computer will proceed to a step 46 to inquire whether the value of PASSWORD is equal to the value of KEY in a step 46. It is to be appreciated that the value of PASSWORD should be equal to the value of KEY since the same mathematical function $f_2$ was used with respect to the same variables, namely intermediate code, IC, and the software product ID, SP_ID. This will prompt the computer to normally proceed to a step 48 wherein a run authorization will be provided for the software product having the software product identifier SP_ID.

Referring again to step 46, in the event that the user has however loaded the load program and application software into a different computer, then the start time will not be the same as was determined for the first installation of the load program. In this regard, it is highly unlikely that the second computer will have generated the same start time. The second computer will also not have the same exact copy of the operating system that was in the first computer. The copy of the operating system in the second computer would have a different operating system ID number assigned to it. This would result in a different intermediate code being generated in the second computer based on the value of both "T" and OS_ID being different. This would therefore result in a different value of the KEY being computed in the second computer. Any attempt to enter the password previously provided to the user would result in an entered password not being equal to a computed KEY. When this occurs, the load program will continue to cycle around between steps 36–38, 44–46 until such time as the user gave up trying to install the load program and accompanying application software product on the second computer.

It is to be appreciated that a preferred embodiment of a load program implementing a process for uniquely tying a software product to a particular computer running a particular identified operating system has been disclosed. Alterations and modifications to the disclosed process may occur without departing from the scope of the invention. In particular, the load program may include slightly different steps for noting the operating system ID and the system clock value in preparation for computing the intermediate code. The load program may also include different steps for prompting the user's response and entry of a password as well as the comparison of the password to the internally computed KEY. Accordingly, the foregoing description is by way of example only and the invention is to be limited by the following claims.

What is claimed is:

1. A method of preventing the unauthorized use of a computer program that is to be installed in a computer having an operating system installed therein, said method comprising the steps of:

determining, within the computer, a value of a variable that is dependent on a time that the computer program is first installed;

reading, within the computer, an identification of the operating system installed in the computer;

computing, within the computer, an intermediate code which is a mathematical function of both the variable that is dependent on the time the computer program is installed and the identification of the operating system;

computing, externally from the computer, a password which is a predetermined mathematical function of both the intermediate code and a secret, preassigned, identification of the computer program and forwarding the password for entry into the computer;

computing, within the computer, a key to be compared with the password, said key being computed in accordance with the same mathematical function of the intermediate code and the secret, preassigned identification of the computer program used to externally computer the password; and authorizing, within the computer, the execution of the computer program having the secret, preassigned identification in the event the password equals the key.

2. The method of claim 1 wherein said step of determining a value of a variable that is dependent on a time the computer program is installed comprises:

reading a system clock defining an amount of time that has elapsed from a predetermined time of day; and setting the variable dependent on the time the computer program is installed equal to the time from the system clock whereby the value of the variable may be repeatedly used to compute the intermediate code.

3. The method of claim 1 further comprising:

reading the secret, preassigned identification of the computer program from an embedded location within the installed computer program before computing the key.

4. The method of claim 1 further comprising the step of verifying, externally from the computer, that the computer program is being installed by a party having authorization to install and use the computer program before proceeding to said step of externally computing a password.

5. The method of claim 1 further comprising the step of displaying, within the computer, the value of the computed intermediate code so that the user of the computer may transmit the intermediate code to a location remote from the computer wherein the external computation of the password is to occur.

6. A media containing a load program and a computer program, said computer program to be installed in a computer using the load program comprising:

instructions for reading a time indicated by a system clock within the computer during an initial execution of the load program;

instructions for storing the read time so that the read time may be used by the computer executing the load program each time the load program is executed;

instructions for reading an identification of an operating system in the computer;

instructions for computing an intermediate code as a function of the read time and the read identification of the operating system; and instructions for further computing a key which is a function of the intermediate code and an identification of the computer program to be installed in the computer.

7. The media of claim 6 wherein said load program further comprises:

instructions for comparing the computer key with an externally entered password and authorizing running of the computer program if the computed key has a predetermined relationship with the password.

8. The media of claim 7 wherein the password is equal to the computed key if the key is computed on the same computer in which the load program was installed.

* * * * *